(12) United States Patent
Nakai (10) Patent No.: US 8,130,621 B2
(45) Date of Patent: Mar. 6, 2012

(54) OPTICAL HEAD DEVICE AND OPTICAL DISK PLAYBACK SYSTEM

(75) Inventor: Kenya Nakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/744,901

(22) PCT Filed: Aug. 21, 2008

(86) PCT No.: PCT/JP2008/064869
§ 371 (c)(1),
(2), (4) Date: Oct. 25, 2010

(87) PCT Pub. No.: WO2009/069348
PCT Pub. Date: Jun. 4, 2009

(65) Prior Publication Data
US 2011/0032812 A1    Feb. 10, 2011

(30) Foreign Application Priority Data
Nov. 27, 2007 (JP) .................................. 2007-305766

(51) Int. Cl.
*G11B 7/00* (2006.01)

(52) U.S. Cl. ......... 369/112.05; 369/112.16; 369/112.22; 369/118

(58) Field of Classification Search ............. 369/112.02, 369/112.23–112.26, 118, 44.24, 44.41, 44.23, 369/112.22, 112.01, 112.05, 112.16, 112.17
See application file for complete search history.

(56) References Cited

U.S. PATENT DOCUMENTS

| 5,708,648 | A  | * | 1/1998  | Ohba ........................ 369/112.24 |
| 5,724,334 | A  | * | 3/1998  | Ohba et al. ..................... 369/118 |
| 5,787,061 | A  |   | 7/1998  | Tsuchiya et al. |
| 5,793,734 | A  | * | 8/1998  | Tsuchiya et al. .............. 369/118 |
| 5,986,993 | A  | * | 11/1999 | Yoo et al. ...................... 369/118 |
| 5,991,255 | A  | * | 11/1999 | Takahashi ................ 369/112.23 |
| 6,618,343 | B1 |   | 9/2003  | Saitoh et al. |
| 7,167,433 | B2 | * | 1/2007  | Busch et al. ............. 369/112.23 |
| 2005/0018554 | A1 | * | 1/2005 | Shiba ......................... 369/44.24 |

FOREIGN PATENT DOCUMENTS

| JP | 8-273187    | 10/1996 |
| JP | 9-35320     | 2/1997  |
| JP | 9-185839    | 7/1997  |
| JP | 2000-251306 | 9/2000  |
| JP | 2003-257403 | 9/2003  |
| JP | 2004-79067  | 3/2004  |

OTHER PUBLICATIONS

Fuji et al., "Observation of Eye Pattern on Super-Resolution Near-Field Structure Disk with Write-Strategy Technique", Japanese Journal of Applied Physics, vol. 43, No. 7A, 2004, pp. 4212-4215.
Kikukawa et al., "Low Frequency Noise Reduction of Super-Resolution Near-Field Structure Disc with Platinum-Oxide Layer", ODS Technical Digest, ThC3, 2005.

* cited by examiner

*Primary Examiner* — Thang Tran
(74) *Attorney, Agent, or Firm* — Birch, Stewart, Kolasch & Birch, LLP (57) ABSTRACT

A recording and reproducing device that is capable of improving its reproduction quality by efficiently detecting a reproduction signal having small low frequency noises even when reproducing data on a super-resolution optical disk including recording marks smaller than a diffraction limit.

14 Claims, 7 Drawing Sheets

OPTICAL HEAD DEVICE AND OPTICAL DISK PLAYBACK SYSTEM

TECHNICAL FIELD

The present invention relates to an optical head device that records or reproduces information into or from an optical-recording-reproducing medium, especially, an optical-recording-reproducing medium to which a super-high resolution technique is applied.

BACKGROUND ART

Conventionally, enhancement of storage capacities of various kinds of optical disks have been achieved by making smaller an area on disk tracks where information is written, and by making smaller the size of a light collecting spot on a focus face by adopting a shorter-wavelength laser beam for recording and reproducing and an objective lens with a high numerical aperture.

For example, a CD (compact disk) has a capacity of 650 MB, in which the thickness of the disk substrate serving an optically transparent layer (a transparent cover layer and a spacer layer that are provided on an information recording layer and may be referred to as a transparent substrate) is about 1.2 mm, the wavelength of its laser beam is about 780 nm, and a numerical aperture (NA) of its objective lens is 0.45, whereas a DVD (digital versatile disc) has a capacity of 4.7 GB, in which the thickness of the disk substrate serving as an optically transparent layer is about 0.6 mm, the wavelength of its laser beam is about 650 nm, and the NA is 0.6.

In DVD, two substrates whose thickness is, for example, 0.6 mm, are bonded together to be used as a 1.2 mm-thickness disk.

In BD (Blu-ray disc), which has a higher recording density, a large capacity of 25 GB per recording layer is realized by using an optical disk with its optically transparent layer thinned to 0.1 mm, and by applying a laser beam with its wavelength about 405 nm and the NA of 0.85.

Besides, there is HDDVD (high definition digital versatile disc), for example, in which a large capacity more than 18 GB is realized by using an optical disk whose disk substrate serving as an optically transparent layer has the same thickness of 0.6 mm as that of DVD, and by applying a laser beam with its wavelength being about 405 nm and the NA of 0.65.

Recently, in the field of optical recording, a high-density recording method has been studied that uses a super-resolution optical disk in which an optically nonlinearly mask layer whose refractive index varies according to light intensity is formed.

In this method, by causing a refractive index variation at a portion in a light collecting spot on the optical disk where light is locally intensified or temperature is locally raised, it is possible to reproduce information (for example, Non patent document 1) from a mark whose size is smaller than a diffraction limit $\lambda/4NA$ that is determined from the numerical aperture NA of a condensing lens—a component of the optical head device—and the wavelength $\lambda$ of the light.

In the super-resolution optical disk as described above, to the extent that the mask layer absorbs light, more readout power is required than that in a conventional optical disk. As a result, low frequency noises (or disk noises) outstandingly appear in a reproduction signal (for example, Non patent document 2).

The low frequency noises mainly appear in a frequency band lower than the diffraction-limited spatial frequency.

By the way, a basic principle of reproducing data on an optical disk is that a mark having concave and convex portions or a mark having differences in refractive index diffracts light, which is then transmitted through an objective lens having a numerical aperture NA so as to be detected as a return light by a receiver, which gives a reproduction signal. That is, in a peripheral circumferential portion of the objective lens with the numerical aperture NA, there is much diffracted light that is produced by a mark sequence with a high spatial frequency. On the contrary, in the central portion of the objective lens, there is much diffracted light that is produced by a mark sequence with a low spatial frequency, so that there are also lots of low frequency noises in the central portion of the objective lens. In addition, there is a tendency that, as the spatial frequency of the shortest-mark sequence becomes higher due to densification, the diffraction angle of the diffracted light by the shortest mark becomes larger, reducing the quantity of light that is taken into the objective lens.

Therefore, the signal-noise ratio becomes lower along with densification. Especially, when the shortest mark becomes shorter than the diffraction limit, the ratio is remarkably lowered. In the super-resolution optical disc, because its readout power is being enhanced, low frequency noises themselves become large, making the signal-noise ratio even lower.

In the super-resolution optical disk, it is considered to be an effective method that peripheral portions of a return light beam, where the ratio of a reproduction signal component to low-frequency-band noises is observed to be high, are intensified to produce a reproduction signal, and thus it is desired that the peripheral portions of the return light beam, where the quantity of light is small, be detected as much as possible without losses.

In a typical device that records or reproduces data to/from an optical disk, a light beam radiated from a light source is focused by an objective lens onto the optical disk, then reflected or diffracted by the optical disk, again taken into the objective lens as a return light beam, and led to a light receiving device. Then, a reproduction signal is produced based on an electric signal outputted from the light receiving device.

In order to form a light collecting spot in good quality on the optical disk through the objective lens, it is necessary to establish a predetermined-aperture limitation so that a light beam having an entrance pupil diameter (effective entrance pupil diameter) which is determined by the design of the objective lens to be effective to focus the light beam, enters the objective lens.

In many cases of the aperture limitation, a light-beam portion outside the effective entrance pupil diameter is light-blocked, and this is realized, for example, by providing an aperture having a diameter equal to the effective entrance pupil in an objective lens holder.

On the other hand, a return light beam from the optical disk is light-blocked except for a light beam portion that passes through the aperture having the effective entrance pupil diameter, and only the limited light beam portion corresponding to within the effective entrance pupil diameter out of the return light beam reflected or diffracted by the optical disk as aforementioned, is led to a light receiving device.

Here, if light beams are considered to be ideal light rays, the return light beam is collimated by the objective lens and then naturally becomes a light beam having a diameter equal to the effective entrance pupil diameter. That is, the diameter of the return light beam becomes equal to the effective entrance pupil diameter. However, actually, the return light beam spreads due to the diffraction of the optical disk and the diffraction action of the light beam under propagation, so that the return light beam again enters into the objective lens with its diameter larger than the effective entrance pupil diameter, meaning that there is an aperture limitation for the return light beam when the effective entrance pupil diameter is equal to the exit pupil diameter of the objective lens, like the above aperture.

As a method for taking in much light from peripheral portions of the return light beam, not only the exit pupil diameter but also the effective entrance pupil diameter may be enlarged by using an objective lens with an increased numerical aperture so as to enhance the reproduction resolution itself. However, this requires using a high-manufacturing-cost objective lens whose light-condensing performance is ensured also for an increased portion in its numerical aperture so as not to degrade the quality of the light collecting spot, leading to a situation where inexpensive optical head devices cannot be provided.

[Non patent document 1] "Observation of Eye Pattern on Super-Resolution Near-Field Structure Disk with Write-Strategy Technique", Jpn. J. Appl. Phys., Vol. 43, No. 7A, 2004, pp. 4212-4215

[Non patent document 2] "Low Frequency Noise Reduction of Super-Resolution Near-Field Structure Disc with Platinum-Oxide Layer", ODS Technical Digest, ThC3 (2005)

DISCLOSURE OF THE INVENTION

Problem to be Solved by the Invention

The present invention is made to solve the problems described above and aims to provide, without using a high-cost objective lens having a large numerical aperture, an optical head device that detects, effectively and without losses, peripheral portions of the return light beam as a signal having a large ratio of a reproduction signal component to low-frequency-band noise components.

Means for Solving Problem

An optical head device includes a light source; an objective lens that focuses a light beam radiated from the light source to form a beam focused on an information recording layer of an optical disk; a light receiving device that has a plurality of light reception surfaces to receive light reflected from the optical disk, the light receiving device converting a quantity of the light received on the plurality of the respective light reception surfaces into electrical signals to detect an information reproduction signal of the optical disk and/or its error detection signal; and an aperture control means that makes an exit pupil diameter of the objective lens for the reflection light larger than an entrance pupil diameter of the objective lens for the light beam, wherein the optical head device detects, using the light receiving device, reflection light within an area larger than the entrance pupil diameter, and produces a reproduction signal by summing up or differentiating between the electrical signals outputted from the light receiving device.

Effect of the Invention

According to the present invention, an optical head device can be provided that detects, without using a high-manufacturing-cost objective lens having a large numerical aperture, peripheral portions of a return light beam without losses to obtain a signal having a large ratio of a reproduction signal component to low-frequency-band noise components.

| [Reference Numerals] | |
|---|---|
| 1 | semiconductor laser |
| 2a, 2b, 2c | light beam |
| 3 | collimation lens |
| 4 | beam splitter |
| 5, 15 | aperture control element |
| 6 | quarter-wavelength plate |
| 7 | optical disc/disk |
| 8 | objective lens |
| 9 | return light beam |
| 10 | condensing lens |
| 11 | light receiving device |
| 16 | analyzer |
| 20 | grating substrate |
| 21 | grating groove |
| 30, 31, 32, 33 | light beam |
| 40, 41, 42 | element |
| 50, 51, 52, 53, 54 | gain circuit |
| 70, 71 | aperture control means |

BEST MODE FOR CARRYING OUT THE INVENTION

Embodiment 1

Embodiment 1 according to the present invention will be explained below, based on FIG. 1 through FIG. 4.

Figure 1:
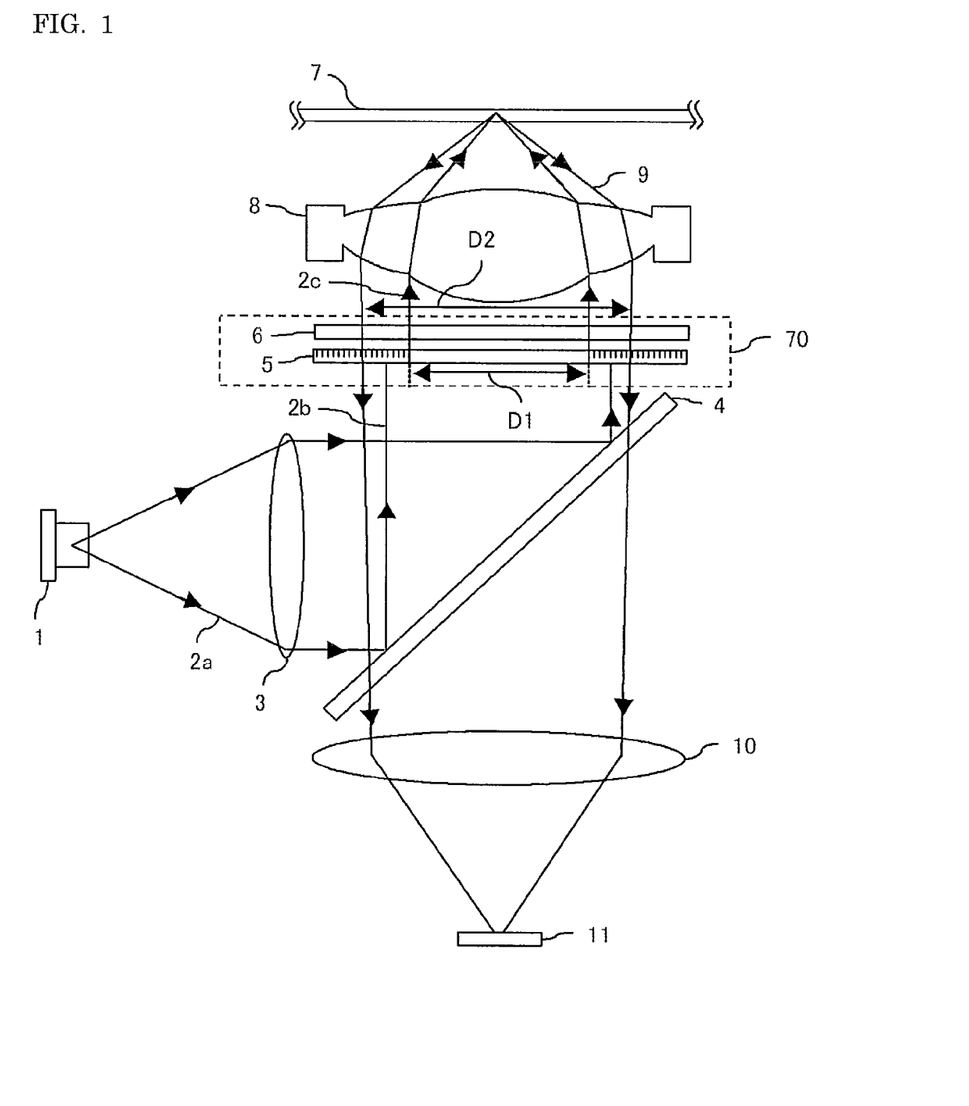
FIG. 1 is a configuration diagram that outlines the whole configuration of an optical head device of Embodiment 1 according to the present invention.

FIG. 1 is a configuration diagram that outlines the configuration of an optical head device of Embodiment 1 according to the present invention.

Numeral 1 indicates a semiconductor laser that radiates light having a wavelength 2; numeral 2a indicates an approximately-linearly polarized light beam radiated from the semiconductor laser 1; numeral 3 indicates a collimation lens that converts the light beam 2a to an approximately collimated light beam 2b; numeral 4 indicates a beam splitter that has a reflection-transmission function to reflect the light beam 2b; numeral 5 indicates an aperture control element that has an anisotropy in diffraction action depending on the polarization direction of the incident light and transmits only light that corresponds to a central and circular portion with its diameter D1 in light fluxes of the light beam 2b, as an approximately collimated beam. Numeral 6 indicates a quarter-wavelength plate that converts linearly-polarized light into circularly-polarized light; a light beam 2c is a light beam that passed through a circular portion of a diameter D1 located at a central portion of the aperture control element 5, and then passed through the quarter-wavelength plate 6; numeral 7 is an optical disk that records information on its surface; numeral 8 is an objective lens that forms a light collecting spot on an information recording surface of the optical disk 7, using the light beam 2c; numeral 9 is a return light beam that is returned from and diffracted by the optical disk 7; numeral 10 is a condensing lens that converts to a converging light beam, the return light beam 9 that has passed through the objective lens 8, the quarter-wavelength plate 6, the aperture control element 5, and the beam splitter 4; numeral 11 is a light receiving device that receives the return light beam 9 converted to the converging light beam to detect the quantity of the received light. In FIG. 1, although the return light beam 9 is shown larger in beam diameter than the light beam 2b, the invention is not limited to such cases but may be the case where the diameter of the light beam 2b is larger than that of the return light beam 9, giving no influence to the effects of the present invention.

Figure 2:
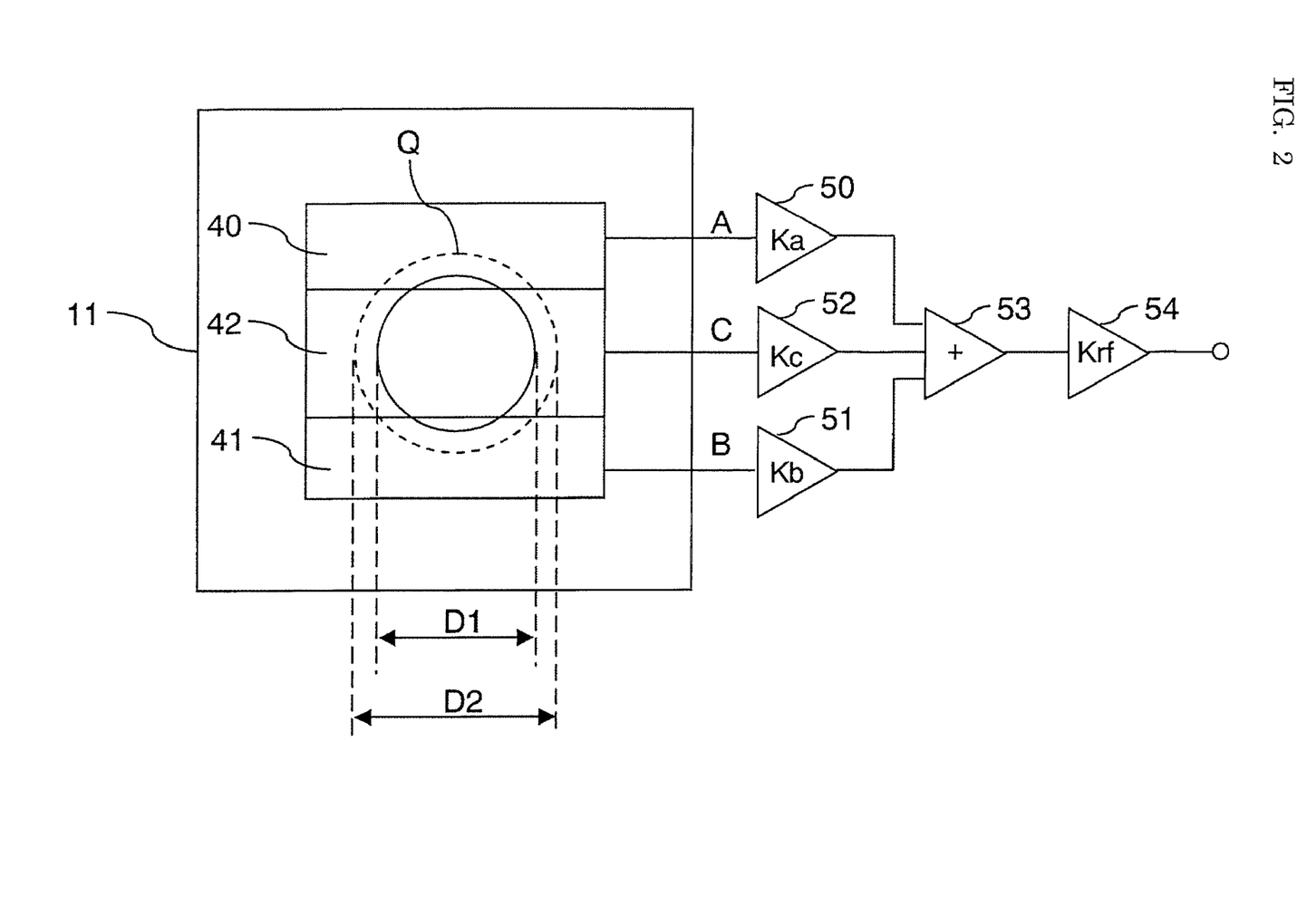
FIG. 2 is a configuration diagram that outlines an aperture control element in the optical head device of Embodiment 1 according to the present invention.

In FIG. 2, illustrated are a light reception surface of the light receiving device 11, the return light beam Q that is received on the light reception surface, elements 40 through 42 that are division segments of the light reception surface, and operation circuits that produce reproduction signals from electric output signals A through C corresponding to quantities of light received by the elements 40 through 42, respectively.

Numerals 50 through 52 indicate gain circuits that convert signal levels of the outputs A through C and have gain values Ka through Kc, respectively. In addition, numeral 53 indicates an adder, and numeral 54 indicates a gain circuit with a gain value Krf. Any of these gain circuits 50 through 52, and 54 may be omitted, so far as the function of the gain circuit to be omitted is also installed in another gain circuit.

A reproduction signal RF is produced according to an operation equation of RF=Krf×(Ka×A+Kb×B+Kc×C) (gain values Ka through Kc may be positive or negative).

A light reception surface pattern having three divided portions of the elements 40 through 42 in FIG. 2 consists of the elements 40 and 41 that receive and detect peripheral portions of the return light beam, and the element 42 that receives and detects a central portion thereof, so that the absolute values of Ka and Kb among the gain values Ka through Kc are made larger so as to obtain the reproduction signal RF whose components corresponding to peripheral portions of the return light are intensified, compared to that corresponding to the central portion.

The light reception surface pattern shown in FIG. 2 is an example for significantly detecting peripheral portions of the light beam compared to its central portion. Therefore, it is not limited to that pattern and another pattern that has a different number of elements or a different number of gain circuits may be applied, as long as the same effect is substantially obtained with the another pattern.

As a result, a reproduction signal can be obtained with small low frequency noises compared with those produced in a case in which gains are set as Ka=Kb=Kc=1, that is, a reproduction signal can be obtained with an increased ratio of a signal component to noise.

In the following explanation, a light path from a semiconductor laser 1—a light source—to the optical disk 7 is referred to as a beam going path, and a light path from the optical disk 7 to the light receiving device 11 is referred to as a beam return path.

The linear polarization direction of the light beam 2a is set according to the structure of the aperture control element 5, which will be described later.

The light focusing performance of the objective lens 8 is ensured in a range of its numerical aperture NA and the entrance pupil diameter D1. Thus, a lens surface area outside the area defined by the entrance pupil diameter D1 is not ensured in the focusing performance, and is not used for the beam going path.

The return light beam 9 is a whole light beam that is diffracted and reflected by the optical disk 7 and then returns back spreading over an aperture range wider than that defined by the incidence numerical aperture NA. Therefore, it means that the return light beam 9 illustrated by broken lines in FIG. 1 includes light beam fluxes inside thereof.

Moreover, the return light beam 9 is converted, by passing through the quarter-wavelength plate 6, into a polarization beam whose polarization plane is rotated by 90 degrees from that of the light beam 2b entering from a side where the aperture control element 5 is placed.

Moreover, the beam splitter 4 may be a polarization beam splitter whose main function is to reflect the polarized light beam 2b in a beam going path but transmit a light beam whose polarization plane is rotated by 90 degrees from that of the polarized light beam, which can improve light-use efficiency in its optical system.

Although FIG. 1 shows that the objective lens 8 has curvature discontinuity between the shape within the pupil diameter D1 and the shape beyond the pupil diameter D1 to the pupil diameter D2, such a discontinuity is illustrated only for helping understand that the area within the pupil diameter D1 is an effective entrance pupil which is ensured on a design basis for the objective lens 8 to focus light, and the area outside thereof is not ensured, and thus, it is not always necessary that the lens has a shape shown in the figure.

In addition, FIG. 1 shows a minimum configuration for the optical head device of Embodiment 1 according to the present invention, thus optical elements other than those shown in the figure may be added if needed.

Figure 3:
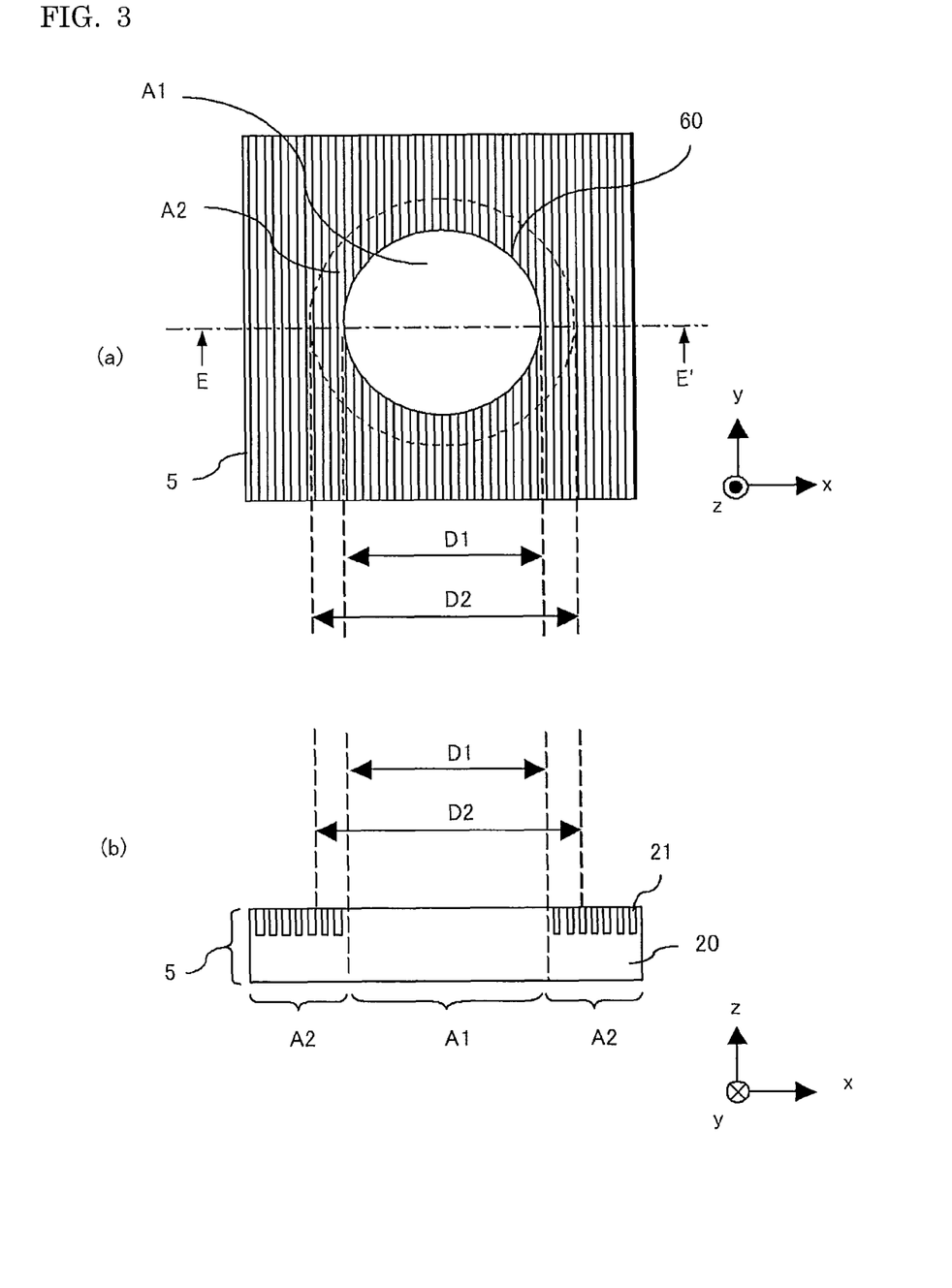
FIG. 3 are an outlined view of an example of an light reception surface of an light receiving device and a view of an operational circuit for a return light beam and a reproduction signal, in the optical head device of Embodiment 1 according to the present invention.

FIG. 3 are outlined views (FIG. 3A is a top view, and FIG. 3B is its cross-sectional view taken along E-E' line shown in FIG. 3A) that show a configuration corresponding to the aperture control element 5 in the aperture control means 70 that includes the aperture control element 5 and a quarter-wavelength plate 6. This control element will be explained.

The aperture control element 5 has an area A1 divided by an approximately circular boundary 60 and an area A2 positioned outside thereof.

The area A1 is a full transmission area which simply transmits, similarly to the action of a glass plate, light as it is.

The area A2 outside the area A1 is a polarization-diffraction grating area that has different transmission characteristics depending on the polarization direction of the entering light, and composed of a grating substrate 20 on which grating grooves are formed in a top/bottom direction of the document sheet in FIG. 3A (in a front/back direction of the document sheet in FIG. 3B)—that is, the grooves are formed along a y-direction—and a birefringent material with which the grating grooves are filled.

The polarization-diffraction area A2 comprises, for example, the grating substrate 20 with a refractive index n whose grating grooves 21 are filled with a birefringent material with a refractive index n in an x-direction and a refractive index ne (ne≠n) in a y-direction.

The grating substrate 20 where the polarization-diffraction grating area A2 is formed has a refractive index n. Thus, for light polarized in the x direction, a refractive-index difference Δnx between the grating substrate 20 of the polarization-diffraction grating area A2 and the birefringent material with which the grating grooves 21 are filled becomes Δnx=0 (=n−n), resulting in no diffraction grating effect, whereas, providing light polarized in the y direction with a diffraction grating effect due to a refractive index difference Δny=(n−ne).

Figure 4:
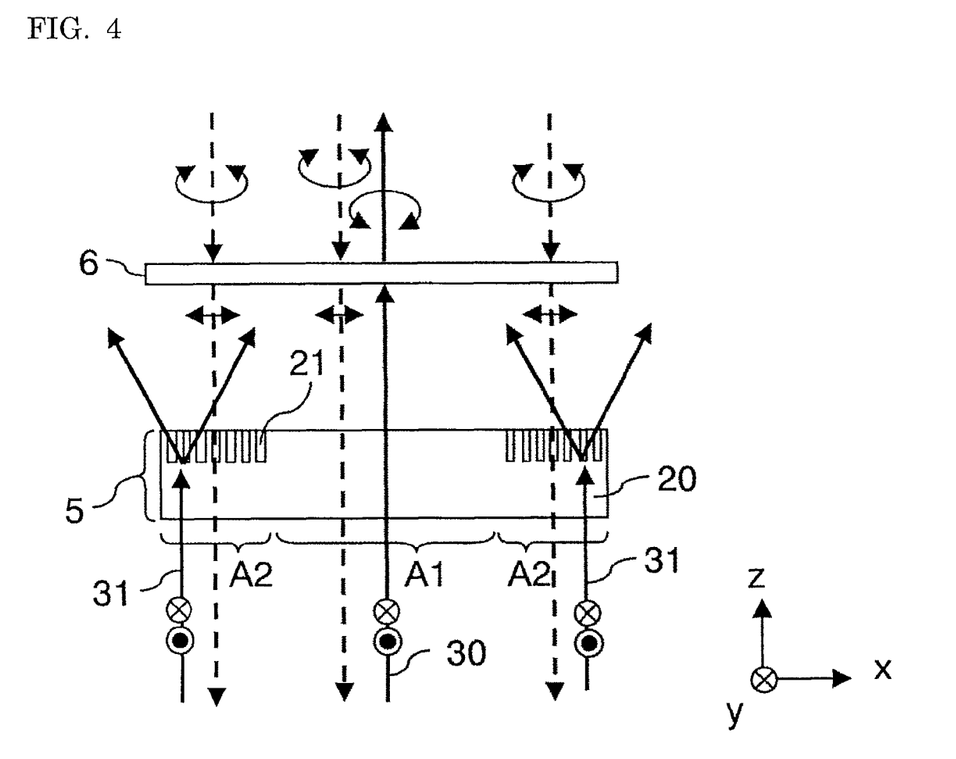
FIG. 4 is a diagram that illustrates a function of an aperture control means realized by an aperture control element and a quarter-wavelength plate in the optical head device of Embodiment 1 according to the present invention.

FIG. 4 is a view that illustrates a configuration corresponding to the aperture control element 5 and the quarter-wavelength plate 6 of the optical head device shown in FIG. 1. A light beam 30 polarized in the y-direction incident to the area A1, passes through the aperture control element 5 and the quarter-wavelength plate 6, and is then reflected by the optical disk 7 to again pass through the quarter-wavelength plate 6 and the aperture control element 5, returning back as a light polarized in the x direction.

A light beam 31 entering an area A2 becomes a beam that does not enter the objective lens, or a beam that does not contribute to a light collecting spot formed by the objective lens 8, as the aperture control element 5 serves as a diffraction grating due to a refractive index difference Δny=(n−ne).

On the other hand, a light beam 30 passing through the area A1 is diffracted and reflected by the optical disk 7, propagates as the return light beam 9 spreading wider than the entrance pupil diameter D1, and is polarized in the x direction by the quarter-wavelength plate 6 to enter the area A2. Then, the light beam polarized in the x direction can pass the aperture control element 5 without being diffracted. Here, it is assumed that the diameter of the area A1 corresponds to the diameter D1.

The aperture control element 5 described above is used for the optical head device shown in FIG. 1. The polarization of the light beam 2a is set to be in the y direction, similarly to the light beam 30 and the light beam 31 shown in FIG. 4. Because the exit pupil diameter D2 of the objective lens 8 can be made wider than the entrance pupil diameter D1, the return light beam 9 which is spread by diffraction or reflection of the optical disk 7 can be led to the light receiving device 11 without losses, without enlarging the warranty scope of the numerical aperture of the objective lens 8.

The aperture control means 70 that includes the polarization diffraction area A2 showing different transmission characteristics depending on polarization direction and that is capable of setting substantially different sizes between the entrance pupil diameter D1 and the exit pupil diameter D2 of the objective lens 8, is placed in the neighborhood of the objective lens 8 so that a return light beam spreading wider than the entrance pupil diameter D1 can be detected by the light receiving device 11. Thus, an optical head device is provided that detects without loss, peripheral portions of the return light beam so as to obtain a reproduction signal having a large ratio of a reproduction signal component to the low-frequency-band noises, without using a high-manufacturing-cost objective lens with a large numerical aperture.

Therefore, according to Embodiment 1 of the present invention, it is possible to provide an optical head device that gives a reproduction signal having a large ratio of a reproduction signal component to the low-frequency-band noises, with its manufacturing cost being suppressed.

The same effect can be obtained in a configuration in which the birefringent material in the grooves of the aperture control element 5 has the refractive index n in the y direction and the refractive index ne (ne≠n) in the x direction and the light beam 2b to be incident is polarized in the x direction.

Embodiment 2

Embodiment 2 of the present invention will be explained below, using FIG. 5 through FIG. 7.

Figure 5:
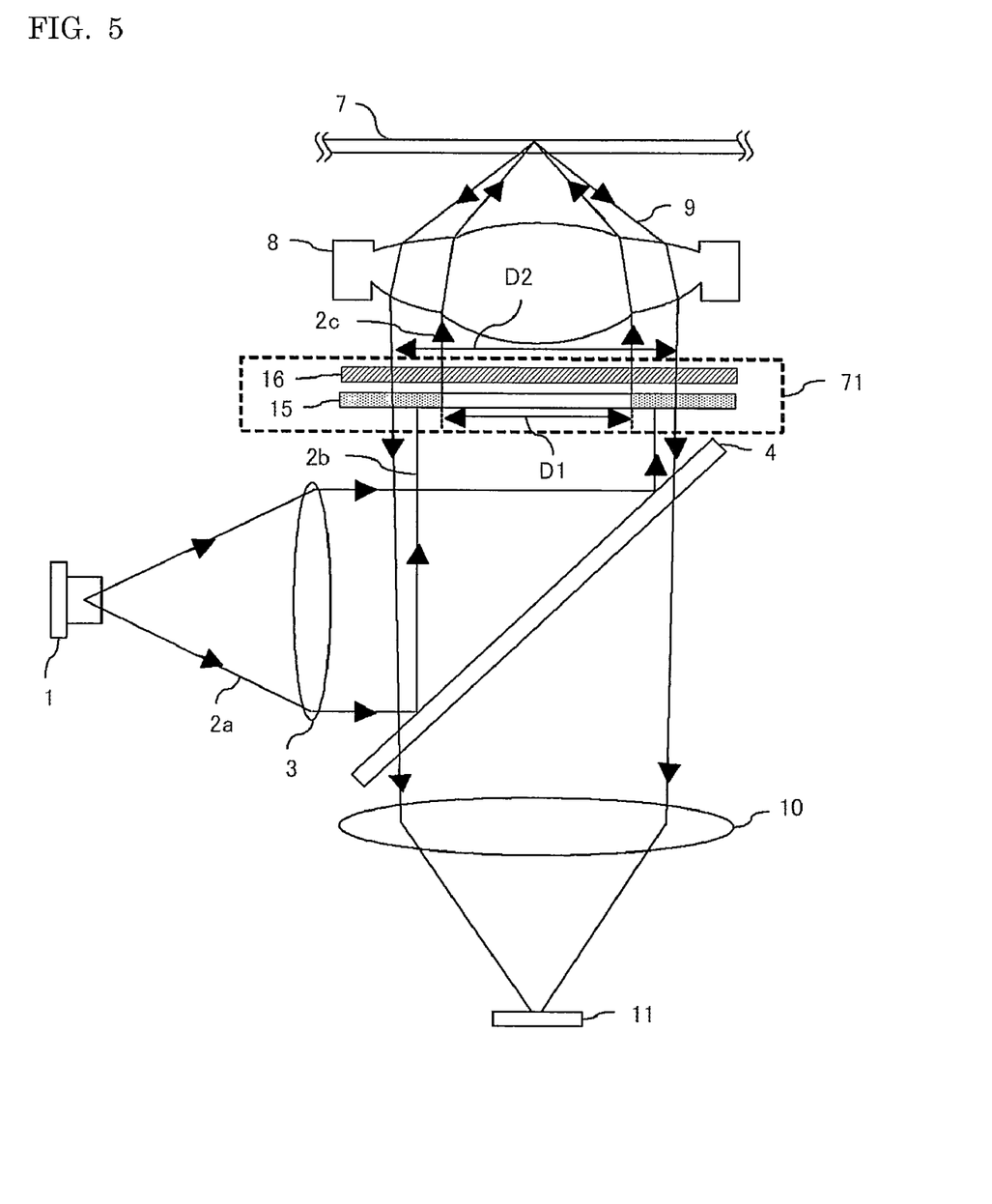
FIG. 5 is a configuration diagram that outlines the whole configuration of an optical head device of Embodiment 2 according to the present invention.

FIG. 5 is a configuration diagram that outlines the configuration of an optical head device of Embodiment 2 according to the present invention;

Explanation of contents common with those of configuration of Embodiment 1 according to the present invention will be omitted, and only contents that are different from those of Embodiment 1 will be explained.

Numeral 15 indicates an aperture control element of Embodiment 2 according to the present invention, and numeral 16 indicates an analyzer that transmits only a component polarized in a certain direction.

A beam splitter 4 is a non-polarizing beam splitter that has a transmittance and a reflectance for components polarized in any direction.

An aperture control element 15 has an area A1 through which a light beam with an effective entrance pupil diameter D1 of the objective lens passes, and an area A2 outside the area A1 which has a transmission characteristic different from that of the area A1, so that the aperture control element has, similarly to that shown in FIG. 2 for explaining Embodiment 1, two areas having different functions from each other.

Figure 6:
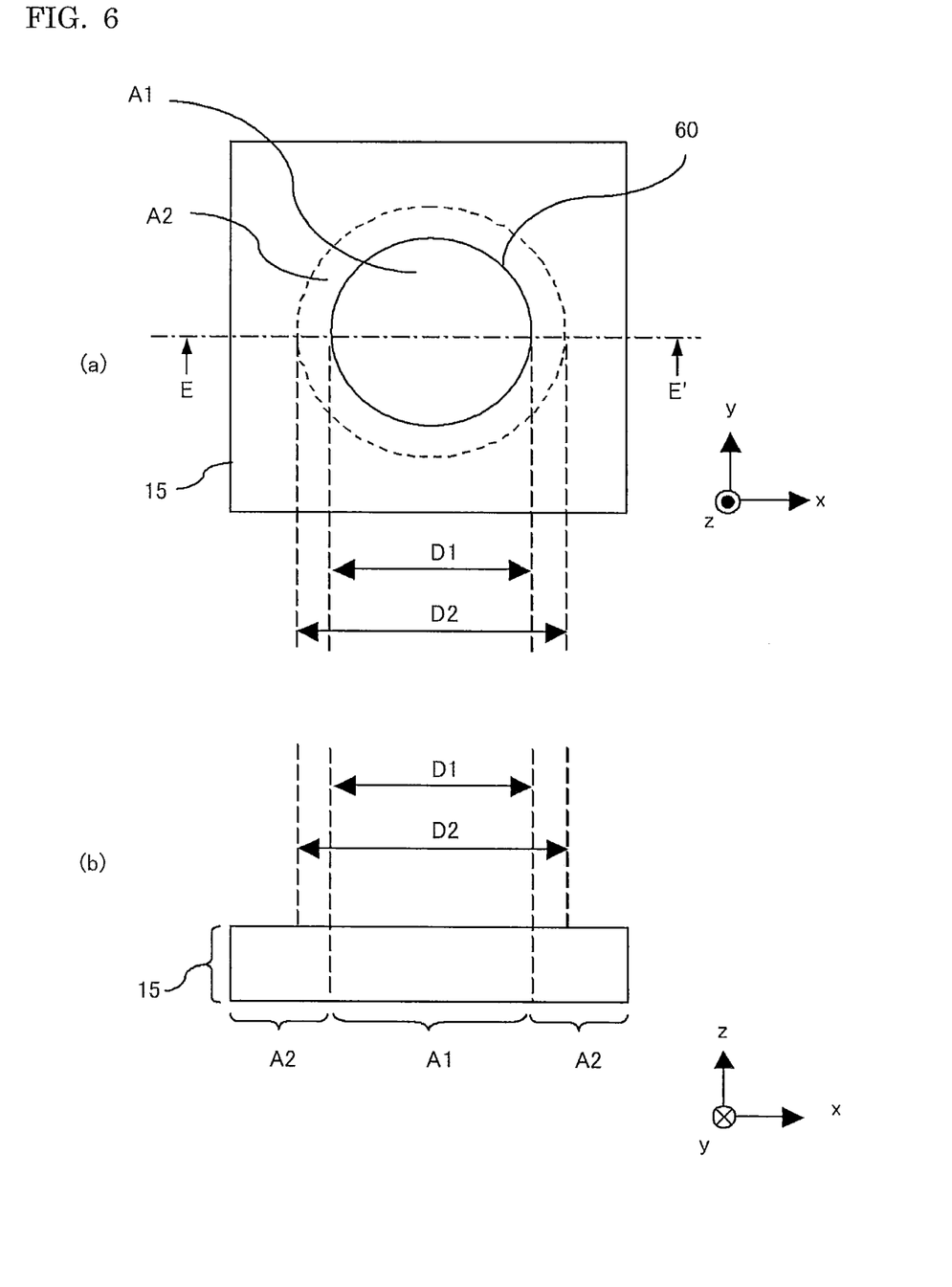
FIG. 6 is a configuration view that outlines an aperture control element in the optical head device of Embodiment 2 according to the present invention.

More specifically, the aperture control element 15 has an area A1 divided by an approximate circular boundary 60 shown in FIG. 6 and an area A2 positioned outside thereof (FIG. 6A is its top view, and FIG. 6B is its cross-sectional view taken along E-E' line), and the area A1 is a full transmission area which simply passes, similarly to the action of a glass plate, light as it is.

The feature of the aperture control element, shown in FIG. 6, of Embodiment 2 according to the present invention is that the area A2 serves as a half-wavelength plate.

Figure 7:
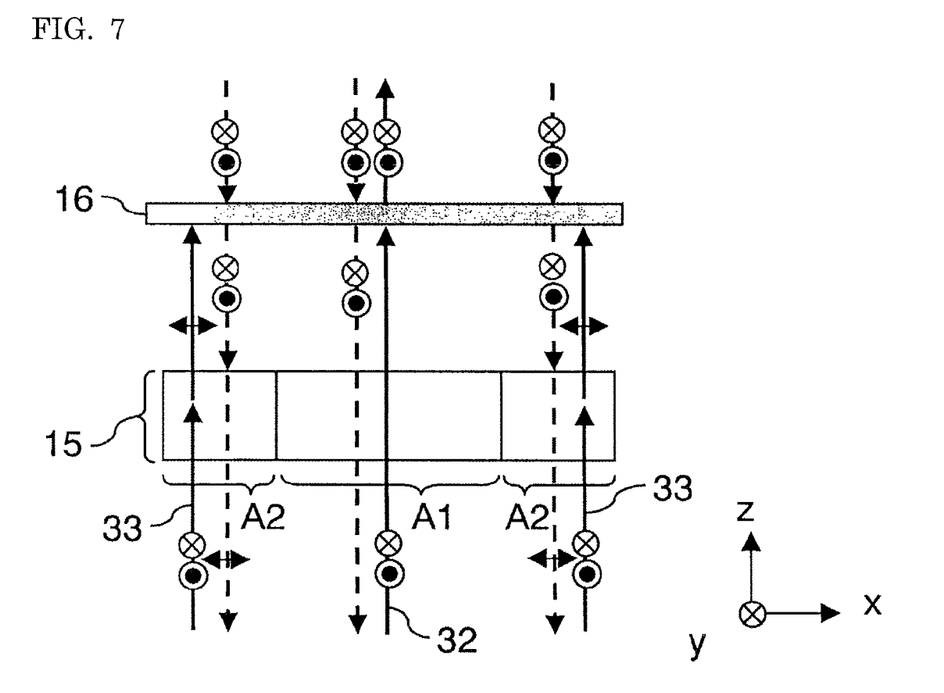
FIG. 7 is a diagram that illustrates a function of an aperture control means realized by the aperture control element and an analyzer in the optical head device of Embodiment 2 according to the present invention.

FIG. 7 is a view showing an aperture control means 71 of Embodiment 2 according to the present invention, and its function will be explained.

When polarization of the light beam 2a is set to be in a y direction so that polarization of the light beam 2b is set to be in the y direction, a light beam 32 entering the area A1 passes, along the beam going path, through an aperture control element 15 and an analyzer 16. Here, it is assumed that the analyzer 16 is placed to pass only a component polarized in the y direction.

In a beam return path after the beam's reflection by the optical disk 7, the light beam 32 that passed through the area A1 and then has been diffracted and reflected by the optical disk 7 propagates as a return light beam 9 with its diameter corresponding to the exit pupil diameter D2 being spread wider than the entrance pupil diameter D1. Then, because the light beam is still a beam polarized in the y direction, it can again pass through the analyzer 16 and the aperture control element 15.

On the other hand, a light beam 33 entering the area A2 of the aperture control element 15 is converted to a light beam whose polarization direction is rotated by the action of the half-wavelength plate by 90 degrees relative to the direction when the beam enters, so that the direction is converted to the x direction.

The analyzer 16 is set, as described above, so as to pass only a component polarized in the y direction, and therefore, the light beam 33 becomes light that does not enter the objective lens.

The aperture control element 15 and the analyzer 16 described above are used for the optical head device shown in FIG. 5. The polarization of the light beam 2a is set to be in the y direction, which is the same direction as the polarization directions of the light beam 32 and the light beam 33 shown in FIG. 7. Because the exit pupil diameter D2 of the objective lens 8 can be made wider than the entrance pupil diameter D1, the return light beam 9 widened by diffraction and reflection actions of the optical disk 7 can be led without losses toward the light receiving device 11, without expanding a warranty scope of the numerical aperture of the objective lens 8.

Therefore, according to Embodiment 1 of the present invention, it is possible to provide an optical head device that gives a reproduction signal having a large ratio of a reproduction signal component to low-frequency-band noises, with its manufacturing cost being suppressed.

The area A2 can be configured, for example, with a half-wavelength plate made of liquid crystal or crystal.

The area A2 may be made of other than what is composed of the liquid crystal or the crystal as long as the area has a function equivalent to that of the half-wavelength plate.

Generally, a diffraction grating whose grating pitch is sufficiently smaller than the wavelength of light can be made, by optimally setting the depth of the grating, to serve as a polarization element that can control a polarization direction of light depending on the direction of the grating and the polarization direction of the light. A polarization plate or a phase plate that controls polarization or phase, using such a sub-wavelength-order structure, is described, for example, in Japanese Patent Application Laid-Open Publication No. 2007-122017.

When light enters such a subwavelength-order diffraction grating structure, a refractive index difference is produced between a polarization light parallel to the grating and a polarization light perpendicular thereto. Thus, it is possible to serves as, for example, a half-wavelength plate by using an incident light beam polarized obliquely 45 degrees relative to the grating and by optimizing the depth and the like of the diffraction grating.

Therefore, by configuring the area A2 of the aperture control element 15 with a half-wavelength plate using the above technique, the same effect can be obtained similarly to the case where the liquid crystal or the crystal is used.

The polarization plate or the phase plate having the sub-wavelength-order diffraction grating can be processed by etching or the like, giving an advantage in that the boundary between the area A1 and the area A2 can be precisely formed in the aperture control element.

The invention claimed is:

1. An optical head device comprising:
    a light source;
    an objective lens that forms from a light beam radiated from the light source, a beam focused on an information recording layer of an optical disk;
    a light receiving device that has a plurality of light reception surfaces to receive light reflected from the optical disk, the light receiving device converting a quantity of the light received on the respective light reception surfaces into electrical signals to detect an information reproduction signal of optical disk and/or its error detection signal; and
    an aperture control means that makes an exit pupil diameter of the objective lens for the reflection light larger than an entrance pupil diameter of the objective lens for the light beam;
    said optical head device detecting, using the light receiving device, reflection light within an area larger than the entrance pupil diameter, and produces a reproduction signal by summing up or differentiating between the electrical signals outputted from the light receiving device, wherein the light receiving device includes a first light reception surface that receives a peripheral portion of the reflection light,
    a second light reception surface that receives a central portion of the reflection light, and
    a signal-level converting means that is capable of varying respective signal levels of electrical signals from the first light reception surface and the second light reception surface,
    and the light receiving device produces the reproduction signal by summing up or differentiating between the electrical signal outputted through the signal-level converting means and the electrical signal outputted through the signal-level converting means from the second light reception surface.

2. The optical head device according to claim 1, wherein the aperture control means comprises
    an aperture control element that has an inner side area and an outer side area which are divided by a boundary that is an approximate circle with its diameter being the effective entrance pupil diameter determined by the design of the objective lens, and
    an analyzer that is placed between the aperture control element and the objective lens, and transmits only light polarized in one direction,
    wherein the outer side area is a half-wavelength plate that rotates the polarization plane of the light beam by 90 degrees.

3. The optical head device according to claim 2, wherein the aperture control means comprises
    an aperture control element that has an inner side area and an outer side area which are divided by a boundary that is an approximate circle with its diameter being the effective entrance pupil diameter of the objective lens, and
    a quarter-wavelength plate that is placed between the aperture control element and the objective lens,
    wherein the inner side area is a transmission area that transmits the light beam and the outer side area is a polarization-diffraction grating area that is filled or loaded with a birefringence material.

4. The optical head device according to claim 2, wherein the aperture control means comprises
    an aperture control element that has an inner side area and an outer side area which are divided by a boundary that is an approximate circle with its diameter being the effective entrance pupil diameter determined by the design of the objective lens, and
    an analyzer that is placed between the aperture control element and the objective lens, and transmits only light polarized in one direction,
    wherein the outer side area comprises a half-wavelength plate that rotates the polarization plane of the light beam by 90 degrees.

5. An optical disk playback system comprising
    the optical head device according to claim 2, to which a super-resolution disk is used as the optical disk.

6. An optical disk playback system comprising the optical head device according to claim 1, to which a super-resolution disk is used as the optical disk.

7. An optical disk playback system comprising
    the optical head device according to claim 6, to which a super-resolution disk is used as the optical disk.

8. An optical head device comprising:
    a light source;
    an objective lens that forms from a light beam radiated from the light source, a beam focused on an information recording layer of an optical disk;
    a light receiving device that has a plurality of light reception surfaces to receive light reflected from the optical disk, the light receiving device converting a quantity of the light received on the respective light reception surfaces into electrical signals to detect an information reproduction signal of optical disk and/or its error detection signal; and an aperture control means that makes an exit pupil diameter of the objective lens for the reflection light larger than an entrance pupil diameter of the objective lens for the light beam;

said optical head device detecting, using the light receiving device, reflection light within an area larger than the entrance pupil diameter, and produces a reproduction signal by summing up or differentiating between the electrical signals outputted from the light receiving device, wherein the aperture control means includes an aperture control element that has an inner side area and an outer side area which are divided by a boundary that is an approximate circle with its diameter being the effective entrance pupil diameter determined by the design of the objective lens, and an analyzer that is placed between the aperture control element and the objective lens, and transmits only light polarized in one direction, wherein the outer side area comprises a half-wavelength plate that rotates the polarization plane of the light beam by 90 degrees.

9. The optical head device according to claim 8, wherein the half-wavelength plate is a polarization diffraction grating that is filled or loaded with a birefringence material, and is also a subwavelength-diffraction grating having a grating pitch of the polarization diffraction grating that is smaller than the wavelength of the light beam.

10. The optical head device according to claim 9, wherein the half-wavelength plate comprises crystal or liquid crystal.

11. An optical disk playback system comprising the optical head device according to claim 10, to which a super-resolution disk is used as the optical disk.

12. An optical disk playback system comprising the optical head device according to claim 9, to which a super-resolution disk is used as the optical disk.

13. An optical disk playback system comprising the optical head device according to claim 9, to which a super-resolution disk is used as the optical disk.

14. An optical disk playback system comprising the optical head device according to claim 8, to which a super-resolution disk is used as the optical disk.

\* \* \* \* \*